United States Patent [19]

Hamilton et al.

[11] Patent Number: 4,653,707
[45] Date of Patent: Mar. 31, 1987

[54] PERSONNEL ELEVATOR FOR COMMERCIAL AIRCRAFT

[75] Inventors: Herbert E. Hamilton, Edmonds; Thomas H. Shorey, Mill Creek; Michael E. Abdelmaseh, Everett, all of Wash.

[73] Assignee: The Boeing Company, Seattle, Wash.

[21] Appl. No.: 687,373

[22] Filed: Dec. 28, 1984

[51] Int. Cl.[4] ............................................. B64D 9/00
[52] U.S. Cl. ............................ 244/137 P; 244/137 R; 244/118.5; 187/94
[58] Field of Search ............. 244/137 P, 137 R, 118.5; 414/540; 187/20, 56, 95, 94, 6

[56] References Cited

U.S. PATENT DOCUMENTS

| | | |
|---|---|---|
| 1,544,431 | 6/1925 | Broyles . |
| 2,086,002 | 7/1937 | Shepard .................................. 187/6 |
| 2,701,068 | 2/1955 | Douglas et al. . |
| 2,950,073 | 8/1960 | McLain et al. . |
| 3,028,130 | 4/1962 | Burton . |
| 3,046,908 | 7/1962 | Yuen . |
| 3,358,950 | 12/1967 | Welsch et al. . |
| 3,517,899 | 6/1970 | Vernon . |
| 3,627,082 | 12/1971 | Berkovitz ............................... 187/56 |
| 3,661,415 | 5/1972 | Piasecki . |
| 3,693,761 | 9/1972 | Fitzgibbon ............................. 187/20 |
| 3,776,492 | 12/1973 | Iben . |
| 3,861,542 | 1/1975 | Molter et al. . |
| 3,880,258 | 4/1975 | Rompa .................................. 187/95 |
| 3,885,685 | 5/1975 | Montgomery et al. . |
| 3,944,087 | 3/1976 | Molter et al. . |
| 3,972,427 | 8/1976 | Stanley et al. . |
| 4,014,483 | 3/1977 | MacNeill .......................... 244/137 P |
| 4,022,404 | 5/1977 | Greiss . |
| 4,055,317 | 10/1977 | Greiss . |

Primary Examiner—Galen Barefoot
Assistant Examiner—Lynn M. Fiorito
Attorney, Agent, or Firm—Christensen, O'Connor, Johnson & Kindness

[57] ABSTRACT

An elevator system for use in a wide-body commercial aircraft having multiple levels within the aircraft provides an elevator shaft that extends through at least two of the levels of the aircraft. The elevator shaft communicates with an opening in the hull of the aircraft. An elevator car is mounted within the shaft and controls and a drive unit are associated with the car to move it within the shaft and also out through the opening in the hull to provide access to and from the aircraft. At least a portion of the car remains in the shaft at all times to provide some lateral stability to the car.

6 Claims, 5 Drawing Figures

PERSONNEL ELEVATOR FOR COMMERCIAL AIRCRAFT

BACKGROUND OF THE INVENTION

This invention relates to elevators for use in commercial aircraft having multiple cabin levels and, more particularly relates to a personnel elevator that will carry passengers and personnel between the cabin levels of the aircraft as well as to and from ground level outside the aircraft.

With the advent of large commercial aircraft, particularly those having multiple cabin levels, it has become desirable to provide an elevator system for moving passengers and personnel between the cabin levels of the aircraft. In the case of an aircraft for government officials or other public figures, it is also desirable to provide the aircraft with access and egress means that not only quickly move the VIP passenger between ground level and the inside of the aircraft, but that also protects the VIP from danger from potential assassins. Up until now, in executive-type aircraft, the passengers have boarded by climbing up a stairway from ground level up into the passenger door of the aircraft. This exposes them to potential crowd problems for some period of time and poses a real problem to security forces trying to protect the individual passengers. Also, in the case of a political or other public figure who is an invalid or handicapped in some way, it is difficult for such passenger to climb the ramp to enter the aircraft.

While certain multilevel aircraft have dumbwaiters and foodcarrying lifts that move between cabin levels of the aircraft to move food and dishes from a galley at one level to passengers at another level, the use of an elevator for moving personnel and passengers between decks is believed to be novel.

SUMMARY OF THE INVENTION

In order to address the needs of the industry as set forth above, the present invention provides a passenger elevator that moves between cabin levels of a multilevel passenger aircraft. The elevator also exits the aircraft through an opening in the aircraft hull and descends to ground level to permit ingress to and egress from the aircraft by means of the elevator. The elevator system includes an elevator shaft that is contained within the hull of the aircraft, and an elevator car that moves through the shaft when inside the confines of the aircraft, but partially exits the shaft when it lowers to ground level. When the elevator car is in the ground level position, a portion of the car remains within the shaft, while the majority of the car is outside the shaft to allow passengers to enter and exit the elevator car.

BRIEF DESCRIPTION OF THE DRAWINGS

The present invention will be better understood by those of ordinary skill in the art and others upon reading the ensuing specification, when taken in conjunction with the appended drawings wherein.

DETAILED DESCRIPTION OF THE PREFERRED EMBODIMENT

Figure 1:
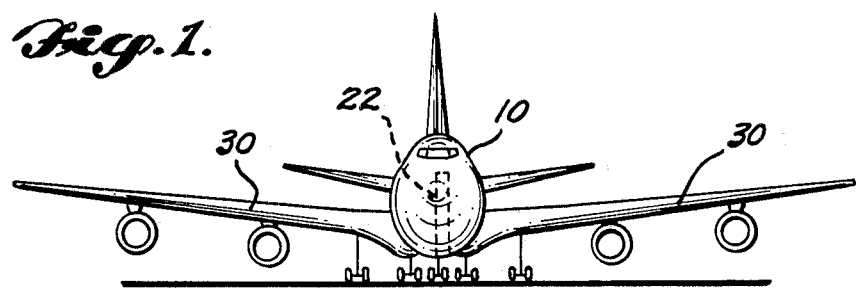
FIG. 1 is a front elevational view of a wide-body commercial passenger aircraft having an elevator shaft therein in accordance with the principles of the present invention.
Figure 2:
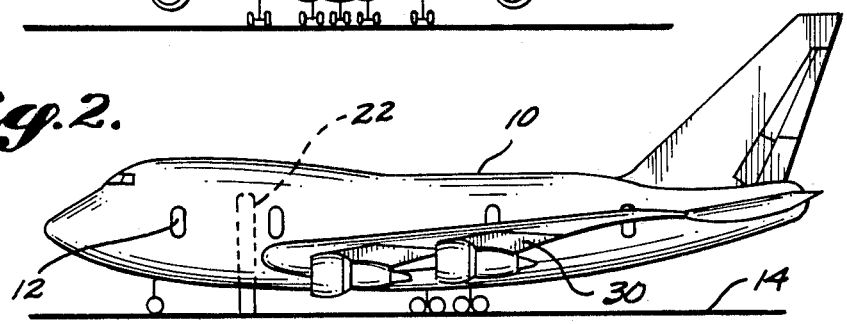
FIG. 2 is a side elevational view of the aircraft of FIG. 1.
Figure 3:
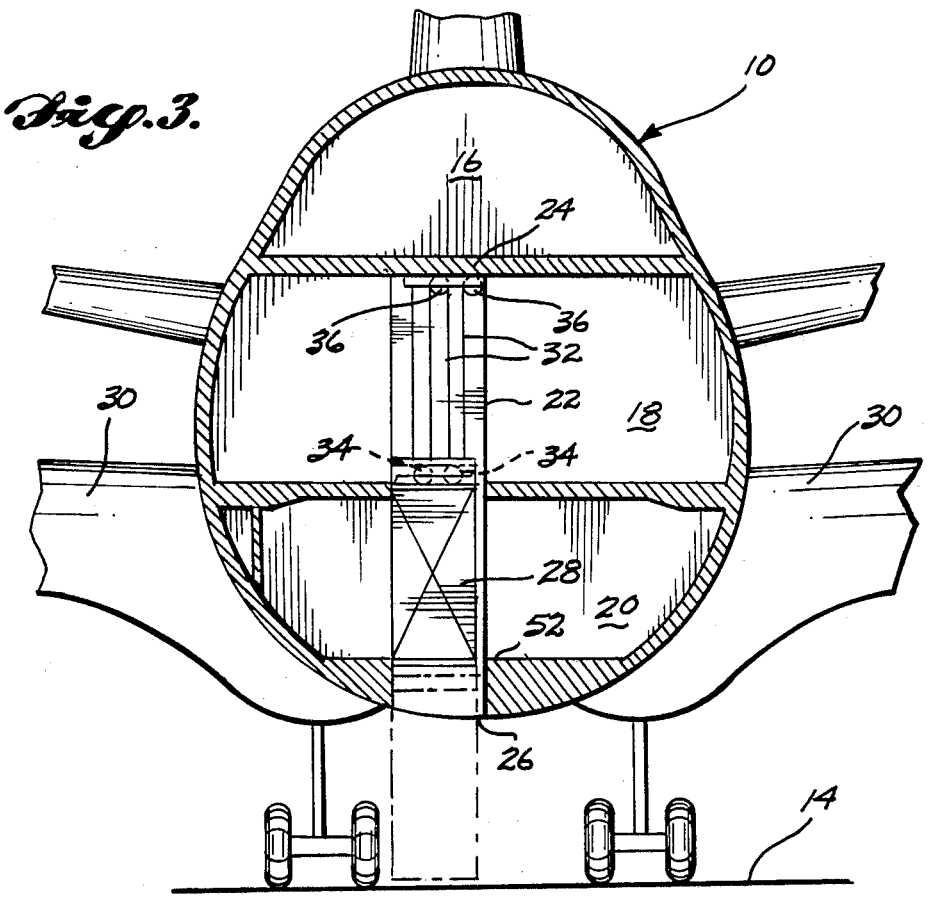
FIG. 3 is a rear elevational view in section of the aircraft of FIG. 1 showing the elevator shaft.

Referring to FIGS. 1, 2, and 3, a typical wide-body jet aircraft 10, such as a Boeing 747, for example, has the passenger doors 12 some distance from the ground level 14. The interior of the aircraft contains multiple levels or decks with the pilot and crew being in the cockpit at the uppermost level 16. A main passenger cabin 18 is located at an intermediate level, and a lower lobe 20 typically contains baggage or cargo storage at the lowermost level of the aircraft. In some aircraft a galley is also located in the lower lobe 20. In accordance with the principles of the present invention, an elevator shaft 22 is located within the aircraft, extending from the deck 24, separating the cockpit level from the main cabin, downwardly through the main cabin and lower lobe of the aircraft and ending adjacent an opening 26 through the bottom of the hull of the aircraft. An elevator car 28 is mounted within the shaft 22 for movement between the main passenger level 18, the lower lobe 20, and the ground level 14, exiting through the opening 26 in the hull of the aircraft. A door must be provided to close the opening 26 in the hull of the aircraft when the elevator car 28 is inside the aircraft to maintain cabin pressurization during flight. In the illustrated embodiment, the elevator shaft 22 is located to the left of the centerline of the aircraft 10 when viewed from the aft of the aircraft, as in FIG. 3, and is forward of the attachment points of wings 30 to the aircraft body. The elevator car 28 is suspended by cables 32 running over pulleys 34 attached to the top of the elevator car 28 and also running over pulleys 36 suspended from the upper deck 24. A more detailed description of the workings of the cables and pulley is given below. The elevator car 28 is long enough so that its bottommost wall can touch the ground 14, while a portion of the elevator car remains within the hull of the aircraft contained within the elevator shaft 22. If the elevator car was completely free of the shaft 22, there would be a tendency for swaying and swinging motion when the cables 32 lowered and lifted the elevator car to and from ground level 14 and, therefore, it is desirable to maintain a portion of the car within the shaft to provide for the stability of the car.

Figure 4:
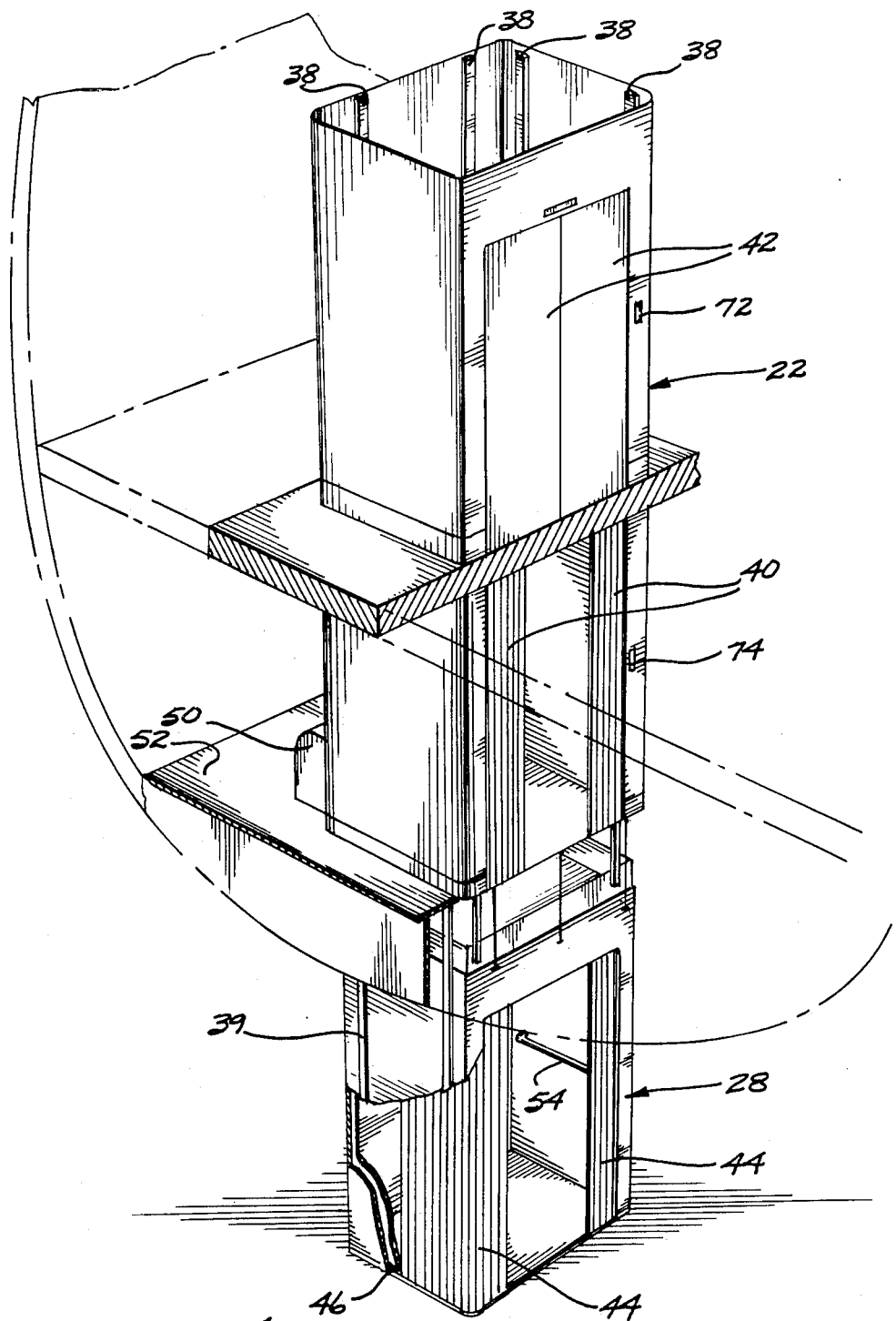
FIG. 4 is an isometric view of an elevator and shaft assembly made in accordance with the principles of the present invention installed within a wide-body, multilevel aircraft with portions of the aircraft removed to permit easy viewing of the elevator assembly.

The elevator car 28 and shaft 22 are shown in greater detail in FIG. 4. The elevator shaft 22 extends from the main level through the lower lobe to the lower skin of the aircraft. The shaft 22 is essentially rectangular in shape and is hollow, of course, to receive the car 28. A series of elongate channel members 38 are attached to the walls of the elevator shaft and run vertically up and down the length of the shaft. The channel members 38 act as grooves for the rails attached to the sidewalls of the elevator car 28 to provide a track within which the car rides. The shaft 22 has safety doors at each level within the aircraft that can be closed when the elevator car is not present at that level to prevent people from falling into the elevator shaft by accident. Any suitable door can be used as the elevator shaft safety door. To conserve space it may be desirable to use an accordian-fold door or some sort of sliding door 40 as is illustrated by the doors in the lower lobe in FIG. 4; however, a swinging type of solid door could also be used as are the doors 42 illustrated in the main level in FIG. 4.

The elevator car 28 itself includes doors 44 constructed of slats that slide on tracks 46 within the walls of the car. As can be seen in FIG. 4, when the car 28 is outside the aircraft and is at ground level, an upper portion of the car 28 remains within the aircraft 10 and within the shaft 22 to provide stability to the car and prevent swaying motion of the car that would occur if the car simply hung free from the elevator cables. As will be explained in greater detail below, the mechanical workings of the motors and gears that run the elevator car are located in a housing 50 on the floor 52 of the lower lobe 20 of the aircraft 10. The elevator car 28 can contain several custom features, such as a fold-down seat (not shown) or a handrail 54 as shown in FIG. 4.

Figure 5:
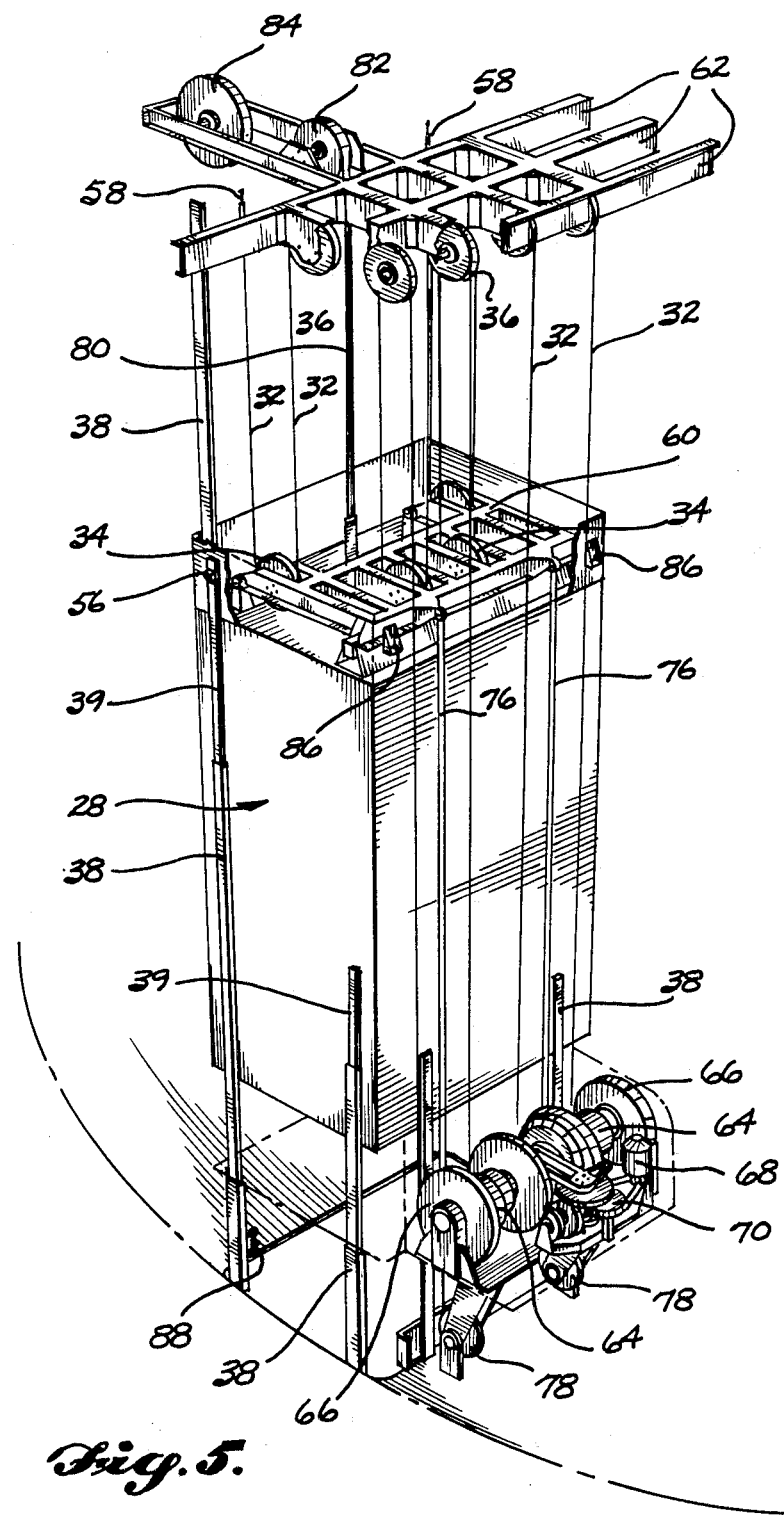
FIG. 5 is an isometric view of an elevator car made in accordance with the principles of the present invention and the mechanical drive elements of the car.

Referring now to FIG. 5, the mechanical workings of the elevator drive mechanism are shown in more detail. In FIG. 5, the car 28 is shown in a position just above the floor 52 of the lower lobe 20 and the elevator shaft 22 is not shown. The channels 38 affixed to the walls of the elevator shaft 22 are shown in FIG. 5 and the interaction between the channels 38 and the rail slats 39 attached to the exterior of the elevator car 28 can be more easily seen. In a preferred embodiment, the rails 39 have roller 56 incorporated therein to assist the motion of the car 28 within the shaft 22. The car 28 itself is suspended from cables 32. The cables 32 are attached at a first end to the lift cable anchor 58 affixed to the structure of the deck 24. The cables 32 then run down to pulley 34 attached to support structure 60 at the top of the elevator car 28. From the pulleys 34 the cables 32 run upward over the pulleys 36 located in the framework 62 in the deck 24 between the main passenger level 18 and the uppermost level 16 of the aircraft. The cables 32 run from the pulleys 36 down to spools 64 of winches 66 housed within the housing 50 on the floor 52 of the lower lobe 20. The winches 66 are preferably run by an electric motor 68 through a suitable gear arrangement 70. The motor 68 is controlled either from inside the elevator car 28 or from outside the elevator shaft in a typical manner such as by control panels 72 and 74.

Preload cables 76 are attached to the upper portion of the elevator car 28. The preload cables 76 are attached to tension-maintaining pulleys mounted below the winches 66. The cables 76 are preloaded to provide a load on the elevator car 28 during positive and negative load conditions encountered during flight maneuvers. A ribbon cable 80 is attached to the car 28 to provide electrical power. The ribbon cable 80 runs over an idler pulley 82 mounted in the floor framework 62 of the upper level and then to a spring-loaded take-up reel 84 arranged so that as the car 28 moves up and down the shaft, the cable is played out from the take-up reel 84 and retrieved by the take-up reel 84.

In a preferred embodiment, physical stops 86 are located at the uppermost corners of the car. The stops 86 engage a lip near the bottom of the shaft to prevent the car from being accidentally completely removed from the shaft. There are also microswitches 88 that interact with the physical stops 86 to shut off power to the car if the car reaches a lower limit position and has not yet touched bottom. Similar limit switches can be provided on the bottom of the elevator car so that electrical power will be shut off to the elevator when the elevator contacts the ground, so as not to overdrive the elevator in the downward direction. Also the stops 86 engage cooperating stops in the aircraft structure and a similar set of limit switches installed in the upper portions of the shaft to prevent overdriving of the elevator in an upward direction.

In a preferred embodiment of the elevator, the elevator car is sized to permit five people to stand therein. Alternatively, one person in a regular-sized wheelchair and his assistant can fit in the car. If desired, the elevator car can have controls built in to prevent its operation or perhaps even its occupation during landing or take-off or in rough, in-flight conditions. Preferably, the elevator car will automatically be moved to the lower lobe position while the airplane is preparing for take-off and landing. An interlock can be provided to prevent opening of the door in the lower skin when the aircraft is in flight so that it is impossible for the elevator car to exit the plane in flight. The elevator system can also include floor selector override controls and communications in a manner typical of building elevators.

The invention, therefore, provides a personnel elevator that not only allows movement between levels of a multilevel passenger aircraft, but also permits ingress to and egress from the aircraft by means of the elevator. The elevator operates within a shaft within the aircraft; however, the shaft opens through the bottom of the aircraft hull through an opening normally closed by a door to permit the elevator to exit the aircraft. The elevator is sized such that when the bottom of the elevator touches ground level some portion of the elevator remains within the shaft to provide stability to the elevator. While a preferred embodiment of the elevator system of the present invention has been described and illustrated, it will be apparent to those of ordinary skill in the art and others that changes can be made to the illustrated embodiment, while remaining within the spirit and the scope of the present invention. For example, the particular door systems shown in the drawings could be changed to other, more convenient doors. Also, while an electric motor and pulley drive has been shown, other suitable drive systems could also be utilized. Since changes can be made to the illustrated embodiment without departing from the scope of the invention, the invention should be defined solely with reference to the claims that follow.

We claim:

1. In a multilevel aircraft, an elevator system for moving people between levels of said aircraft within said hull of the aircraft and between the aircraft and the ground, comprising:

an opening formed in the hull of said aircraft;

an elevator shaft extending between the levels of the aircraft and in communication with the opening in the hull;

an elevator car mounted within said shaft for movement between said levels within said hull and for movement between said hull and the ground;

drive means associated with said car for moving said hull within said shaft;

control means associated with said car and said drive means for controlling said movement of said car, said car being operable to pass through said opening in said hull so that at least a portion of said car is outside of said hull and capable of contacting the ground, said car and said shaft being constructed and arranged so that a portion of said car is always within said shaft; and, preloading means associated with said shaft to maintain positive loading on said car during aircraft in-flight maneuvers during negative G force conditions.

2. The elevator system of claim 1, further including a door associated with said opening and selectively operable to block said opening in said hull.

3. The elevator system of claim 1, further including elongate channel means affixed to the interior of said elevator shaft; and elongate slat means affixed to the exterior of said elevator car, said channel means and slat means cooperating to form a guide rail for said car within said shaft, said slat slidably engaging said channel means.

4. The elevator system of claim 1, further including a roller mounted on said slat and arranged to engage said channel means to assist motion of said slat within said channel.

5. The elevator system of claim 1 wherein said car includes at least one sidewall, said sidewall having an opening formed therein to provide access to the interior of said car and further includes a door mounted on said car and operable to block said opening in said sidewall.

6. The elevator system of claim 5, wherein said sidewall is of double-wall construction, said door being slidable into the interior of said sidewall when moved between its blocking and nonblocking positions.

* * * * *

UNITED STATES PATENT AND TRADEMARK OFFICE
CERTIFICATE OF CORRECTION

PATENT NO.   : 4,653,707
DATED        : March 31, 1987
INVENTOR(S)  : Herbert E. Hamilton, et al It is certified that error appears in the above-identified patent and that said Letters Patent is hereby corrected as shown below:

Column 3, line 29, "roller" should read -- rollers --.

Column 5, line 13, insert -- means -- after "slat".

Column 6, line 1, "1" should read -- 3 --.

Signed and Sealed this

Fifteenth Day of March, 1988

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,653,707

DATED : March 31, 1987

INVENTOR(S) : Hamilton et al.

It is certified that error appears in the above-identified patent and that said Letters Patent is hereby corrected as shown below:

Column 4, line 60, "hull" should be --car--

Signed and Sealed this

Twelfth Day of July, 1988

Attest:

DONALD J. QUIGG

*Attesting Officer*  *Commissioner of Patents and Trademarks*